United States Patent
Mullen et al.

(10) Patent No.: US 11,906,199 B2
(45) Date of Patent: Feb. 20, 2024

(54) ENTHALPY EXCHANGER

(71) Applicant: CORE ENERGY RECOVERY SOLUTIONS INC., Vancouver (CA)

(72) Inventors: Curtis Warren Mullen, Vancouver (CA); David Erwin Kadylak, Surrey (CA); Christopher Robert Barr, Coquitlam (CA); James Franklin Dean, West Vancouver (CA); Guy Timothy Pearson, North Vancouver (CA)

(73) Assignee: CORE ENERGY RECOVERY SOLUTIONS INC., Vancouver (CA)

( * ) Notice: Subject to any disclaimer, the term of this patent is extended or adjusted under 35 U.S.C. 154(b) by 0 days.

(21) Appl. No.: 18/096,560

(22) Filed: Jan. 12, 2023

(65) Prior Publication Data
US 2023/0243526 A1 Aug. 3, 2023

Related U.S. Application Data

(60) Division of application No. 17/079,169, filed on Oct. 23, 2020, now Pat. No. 11,578,881, which is a (Continued)

(51) Int. Cl.
*F24F 3/147* (2006.01)
*F28D 21/00* (2006.01)
(Continued)

(52) U.S. Cl.
CPC ............ *F24F 3/147* (2013.01); *F24F 12/006* (2013.01); *F28D 9/0062* (2013.01);
(Continued)

(58) Field of Classification Search
CPC .. F24F 3/147; F24F 12/006; F24F 2003/1435; F28D 9/0062; F28D 21/0015;
(Continued)

(56) References Cited

U.S. PATENT DOCUMENTS 7,140,107 B2    11/2006   Ohno et al.
7,331,376 B2    2/2008    Gagnon et al.
(Continued)

FOREIGN PATENT DOCUMENTS

CN    101657688 A    2/2010
EP       2146171 A1    1/2010
(Continued)

OTHER PUBLICATIONS http://www.homebuildercanada.com/2603_ERV.htm, 2013.
http://www.builditsolar.com/Experimental/DIYHRV/DIYHRV.htm, Harrowsmith issue #64, Dec. 1985.

*Primary Examiner* — Claire E Rojohn, III
(74) *Attorney, Agent, or Firm* — Oyen Wiggs Green & Mutala LLP

(57) ABSTRACT

A heat and humidity exchanger comprises panels made up of membrane sheets attached on either side of a separator. Channels extend across each panel between the separator and the membrane sheets. The panels are much stiffer than the membrane sheets. Panels are stacked in a spaced apart relationship to provide an ERV core. Spacing between adjacent panels may be smaller than a thickness of the panels.

13 Claims, 10 Drawing Sheets

Related U.S. Application Data continuation of application No. 15/781,792, filed as application No. PCT/CA2016/051505 on Dec. 16, 2016, now Pat. No. 10,845,068.

(60) Provisional application No. 62/269,894, filed on Dec. 18, 2015.

(51) Int. Cl.
| | |
|---|---|
| *F24F 12/00* | (2006.01) |
| *F28D 9/00* | (2006.01) |
| *F28F 21/06* | (2006.01) |
| *F24F 3/14* | (2006.01) |
| *F28F 3/08* | (2006.01) |
| *F28F 13/12* | (2006.01) |

(52) U.S. Cl.
CPC ........ *F28D 21/0015* (2013.01); *F28F 21/061* (2013.01); *F24F 2003/1435* (2013.01); *F28F 3/08* (2013.01); *F28F 13/12* (2013.01); *F28F 2240/00* (2013.01); *F28F 2245/04* (2013.01); *F28F 2275/025* (2013.01); *F28F 2275/062* (2013.01); *F28F 2275/065* (2013.01); *Y02B 30/56* (2013.01)

(58) Field of Classification Search
CPC .. F28F 21/061; F28F 3/08; F28F 13/12; F28F 2240/00; F28F 2245/04; F28F 2275/025; F28F 2275/062; F28F 2275/065; Y02B 30/56
USPC ..................................................... 165/109.1
See application file for complete search history.

(56) References Cited

U.S. PATENT DOCUMENTS

| | | | |
|---|---|---|---|
| 7,875,396 B2 | 1/2011 | Zhang et al. | |
| 8,048,585 B2 | 11/2011 | Skala | |
| 8,091,868 B2 | 1/2012 | Robb et al. | |
| 8,137,853 B2 | 3/2012 | Zhang et al. | |
| 8,235,093 B2 | 8/2012 | Grinbergs et al. | |
| 8,317,907 B2 * | 11/2012 | Martinchek | H01M 8/04141 95/52 |
| 8,550,151 B2 | 10/2013 | Murayama et al. | |
| 8,657,266 B2 * | 2/2014 | Brenner | C08J 5/2206 261/100 |
| 8,669,019 B2 * | 3/2014 | Guzda | H01M 8/04149 429/456 |
| 8,936,668 B2 * | 1/2015 | Huizing | B01D 71/54 96/12 |
| 8,974,977 B2 * | 3/2015 | Brenner | H01M 8/04149 428/220 |
| 9,028,989 B2 * | 5/2015 | Zhang | H01M 8/04141 137/100 |
| 9,048,468 B2 * | 6/2015 | Guzda | B01D 67/0034 |
| 9,203,097 B2 * | 12/2015 | Martinchek | H01M 8/0228 |
| 9,634,340 B2 * | 4/2017 | Martinchek | H01M 8/04291 |
| 2002/0074105 A1 | 6/2002 | Hayashi et al. | |
| 2009/0071638 A1 | 3/2009 | Murayama et al. | |
| 2010/0175859 A1 | 7/2010 | Takada et al. | |
| 2011/0192579 A1 | 8/2011 | Sotokawa et al. | |
| 2012/0061045 A1 | 3/2012 | Huizing | |
| 2012/0073791 A1 | 3/2012 | Dubois | |
| 2013/0056080 A1 | 3/2013 | Martinchek et al. | |
| 2014/0014289 A1 | 1/2014 | Tan | |
| 2014/0076527 A1 | 3/2014 | Grinbergs et al. | |
| 2014/0374067 A1 | 5/2014 | Slayzak et al. | |
| 2014/0306359 A1 | 10/2014 | Martz | |
| 2014/0342132 A1 | 11/2014 | Montie et al. | |
| 2015/0221963 A1 | 8/2015 | Guzda et al. | |
| 2019/0154341 A1 | 5/2019 | Yamamoto | |

FOREIGN PATENT DOCUMENTS

| | | |
|---|---|---|
| JP | 2003-302187 A | 10/2003 |
| WO | 0127552 A1 | 4/2001 |
| WO | 2009089615 A1 | 7/2009 |
| WO | 2014011535 A1 | 1/2014 |

* cited by examiner

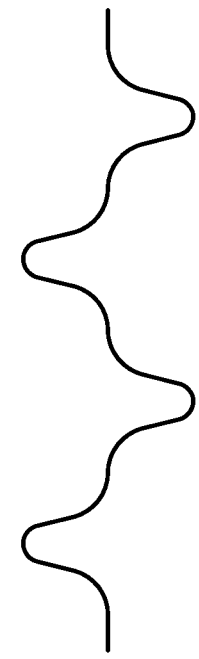
FIG. 2F
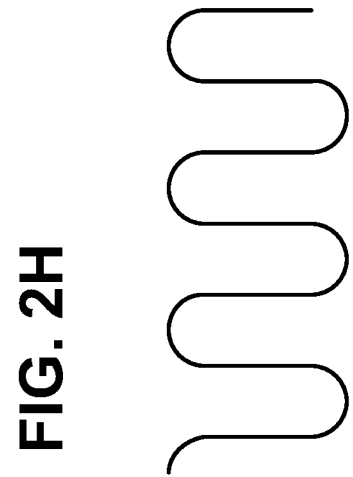
FIG. 2H
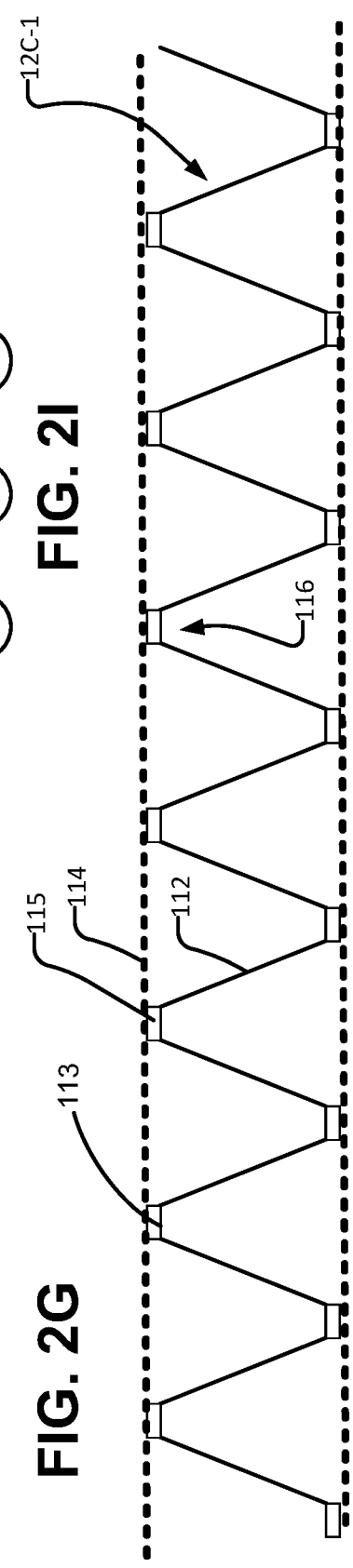
FIG. 2G
FIG. 2I
FIG. 2J

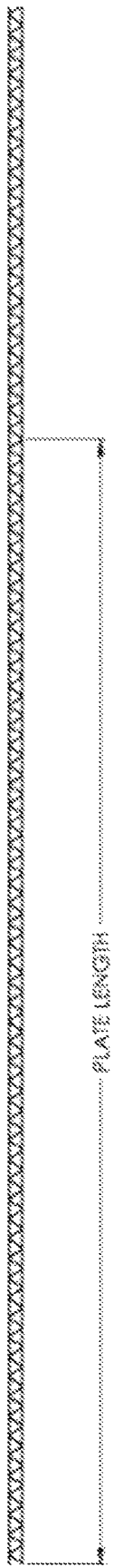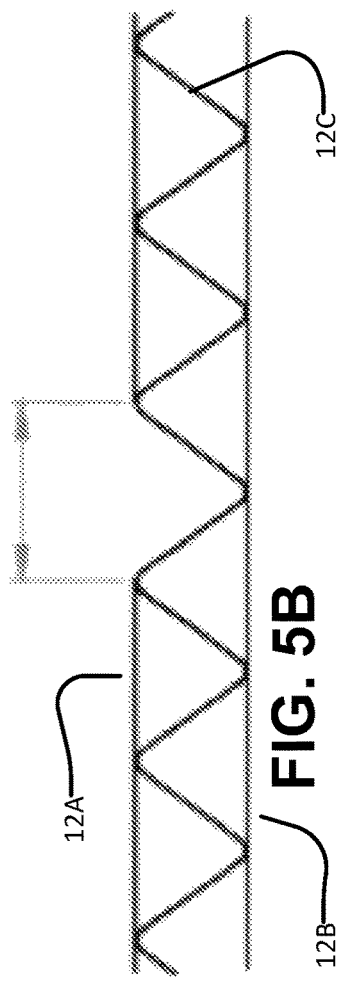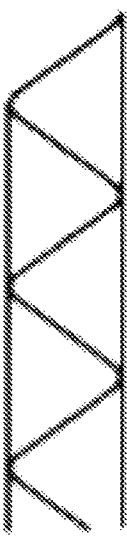
FIG. 5A
FIG. 5B
FIG. 5C

ENTHALPY EXCHANGER

CROSS-REFERENCE TO RELATED APPLICATIONS

This application is a divisional of application Ser. No. 17/079,169 with a 371(c) date of 23 Oct. 2020, which is incorporated by reference in its entirety herein, and which is a continuation of Ser. No. 15/781,792 with a 371(c) date of 6 Jun. 2018, and which is a national stage entry of PCT International Application No. PCT/CA2016/051505 filed 16 Dec. 2016, which claims benefit of provisional 62/269,894 filed 18 Dec. 2015.

FIELD

This invention relates to heat and humidity exchangers comprising water-permeable membranes. Example embodiments provide energy recovery ventilator (ERV) cores comprising water-permeable membranes and ERV systems that include such cores. The invention may be applied in a wide variety of applications where heat and humidity exchange is required. Examples include heat and moisture (humidity) recovery in building ventilation systems, humidification and heat transfer in fuel cells, separation of gases, and desalination treatment of water.

BACKGROUND

Heat and humidity exchangers (also sometimes referred to as humidifiers) have been developed for a variety of applications, including building ventilation (HVAC), medical and respiratory applications, gas drying, and humidifying fuel cell reactants for electrical power generation.

Planar plate-type heat and humidity exchangers use membrane plates that are generally constructed of flat, water-permeable membranes (for example, Nafion®, cellulose, or other polymer membranes) supported between separators. The plates are typically stacked, sealed and configured to accommodate intake and exhaust streams flowing in either cross-flow or counter-flow configurations between alternate plate pairs, so that heat and humidity are transferred between the streams via the membrane.

A heat recovery ventilator (HRV) is a mechanical device that incorporates a heat exchanger in a ventilation system for providing controlled ventilation into a building. The HRV heats or cools incoming fresh air using exhaust air. Devices that also exchange moisture between the incoming fresh air and the exhaust air are generally referred to as Energy Recovery Ventilators (ERVs), sometimes also referred to as Enthalpy Recovery Ventilators. An ERV may remove excess humidity from the ventilating air that is being brought into a building or it may add humidity to the ventilating air. ERVs may be used to save energy and/or to improve indoor air quality in buildings.

The key component of an ERV system which transfers the heat and humidity between air streams, is the ERV core. Often ERV cores are constructed like the planar plate-type heat and humidity exchangers described above. An ERV also typically comprises an enclosure, fans to move the air streams, ducting, as well as filters, control electronics and other components.

FIG. 1 shows an example of a planar plate-type heat and humidity exchanger made from stacked planar sheets of membrane 3 with rigid corrugated separators 6 inserted between the membrane sheets. The separators support the membrane and maintain proper sheet spacing, as well as defining channels 5 for wet and dry streams flowing on opposite sides of each membrane sheet, in a cross-flow arrangement, as indicated by broad arrows 1 and 2 respectively. The membrane material is generally thin, flexible and not self-supporting. The separators 6 support the membrane, and reduce or prevent deflection of the membrane into the channels 5. The stack is encased within a rigid frame 4. In some heat and humidity exchangers, plastic flow field inserts are used instead of corrugated separators to provide support for the membrane, maintain spacing and provide flow channels for the streams on either side of the membrane.

Examples of heat and humidity exchangers with corrugated separators are described in US Patent Application Publication No. US2011/0192579. Examples of heat and humidity exchangers with flow field inserts are described in U.S. Pat. Nos. 7,331,376 and 8,235,093.

Separators, such as corrugated members or flow field inserts that are used in the heat and humidity exchangers described above generally provide controlled or directional gas flow distribution over the membrane surface. However, the presence of such separators can restrict fluid flow across the membrane. The resulting pressure drop across the overall apparatus can be significant. For example, even with parallel, straight channels if a separator provides many closely-spaced ribs to support the membrane, the ribs of any significant thickness will tend to impede the fluid flow, and also increase pressure drop. The ribs may also block access of the fluid to a significant portion of the membrane surface. With more widely-spaced ribs the membrane can deflect into the channel also increasing the pressure drop. In some cases, with flow field inserts, the fluid flow path across the membrane can be quite tortuous which also tends to impede flow and increase pressure drop. Pressure drop is also induced by the increased wall surface area creating drag or friction to the flow. Pressure drop can also be increased as a result of deflection of the membrane into channels provided by the separators.

SUMMARY

This invention has a number of aspects. These aspects may be applied individually or in suitable combinations. Aspects of the invention include, without limitation:
  Humidity exchangers and heat and humidity exchangers;
  Humidifiers for use in association with fuel cells and similar devices;
  Components for humidity exchangers and heat and humidity exchangers;
  Energy recovery ventilator (ERV) installations;
  Methods for exchanging air between the interior and exterior of a building;
  Methods for making humidity exchangers, heat and humidity exchangers, and/or parts for such exchangers; and
  Fabrication apparatus useful for making humidity exchangers, heat and humidity exchangers, and/or parts for such exchangers.

One example aspect of the invention provides a heat and humidity exchanger comprising a plurality of panels. Each of the panels comprises a flexible separator formed to provide projections to either side of a plane of the separator and first and second thin water-vapor-permeable membrane sheets attached to the projections on opposing faces of the separator. The separator holds the first and second water-vapor-permeable membrane sheets in a spaced-apart parallel relationship. The panel is stiffened by the attachment of the membrane sheets to the separator. The projections are formed to provide first channels operable for carrying a first flow between the separator and the first and second water-vapor-permeable sheets in a first direction across each of the panels. The panels are stacked in a parallel spaced-apart relationship to provide open second channels between adjacent ones of the panels, the second channels extend to carry a second flow through the heat and humidity exchanger in a second direction transverse to the first direction.

Advantageously the separator is corrugated or zig-zag in cross section such that the separator provides triangulated support to the membranes and the membranes stiffen the separator.

In some embodiments elongated spacers are provided between the adjacent ones of the panels. The elongated spacers are spaced apart from one another in the first direction such that the second channels comprise relatively wide unobstructed openings. For example, the openings may have widths 20 times or more a thickness of the panels.

In some embodiments the panels are spaced apart from one another by distances that are less than a thickness of the panels. For example, the separators may have a depth that is in the range of 110% to 150%, preferably 125% to 135% of a height of the second channels. In some embodiments each of the panels has a thickness in the range of 1.5 mm to 4 mm.

Portions of the separator to which the membranes are attached may be flattened. Such flattened areas may provide a greater area for adhesion between the membrane and separator. In the case where the separator comprises a corrugated sheet corrugations of the corrugated sheet may be formed to provide ridges having flattened tops. The membrane sheets may be adhered to the separator along the flattened tops of the ridges.

In some embodiments the separator is perforated. The separator may, for example, comprise a number of perforations that provide fluid connection between some or all of the first channels in each panel.

In some embodiments the separator is of a material having a thickness of 0.2 mm or less. For example, the separator may comprise a thin sheet of metal (e.g. aluminum) or plastic.

Vortex-generating features may optionally be provided in some or all of the channels of any embodiment described herein. An example embodiment comprises plural vortex-generating features in at least the first channels or the second channels. The vortex-generating features may comprise projections from and/or indentations into surfaces bounding the channels. In some embodiments the vortex-generating features are formed on one or both of the first and second water-vapor-permeable membrane sheets of a panel. In some embodiments a membrane sheet is embossed or formed to provide vortex-generating features that project on one face of the sheet and provide a corresponding recess on an opposing face of the sheet. In some embodiments a thickness of the membrane (or at least a coating of the membrane) is be similar of the same inside and outside the vortex-generating features formed in or on the membrane.

In some embodiments the vortex-generating features comprise an array of projections formed in a surface of the membrane, the projections having heights of 1 mm or less or 2 mm or less. In some embodiments the vortex-generating features have heights not exceeding 2 mm or 40% of a thickness of the separator, whichever is greater.

The first and/or second water-vapor-permeable membrane sheets in some or all of the panels are optionally asymmetrical. Asymmetrical membrane sheets may comprise a substrate having an air-impermeable, water-vapor permeable coating on one face of the substrate. The substrate may be air permeable. For example, the substrate may comprise a porous (including microporous) substrate. Where a membrane is asymmetrical the first and second water-vapor-permeable membrane sheets may be oriented such that the coatings face into the second channels.

Some embodiments provide one or more of the following features:
  Edges of the panels extending parallel to the first channels are tapered in thickness.
  at flow rates through the first channels and the second channels that are the same and are in the range of 35 to 95 SCFM pressure drops across the first and second channels are the same to within 25 Pa.
  the first and second water-vapor-permeable membrane sheets are affixed to the separator by an adhesive (which may comprise, for example, a hot melt adhesive or a pressure sensitive adhesive.
  The panels are spaced apart by spacer strips that may be solid or hollow and of various cross-sectional configurations including round, square, rectangular. In some embodiments the spacer strips have thicknesses of at least 1.2 mm.

Another aspect of the invention provides an energy recovery ventilation (ERV) installation comprising a heat and humidity exchanger according to any described embodiment. The ERV installation may comprise an external air intake connected to supply air from outside a building to an interior of the building through the first channels or the second channels and external air outlet connected to deliver air from the interior of the building to the exterior of the building by way of the second channels or the first channels. In some embodiments the interior of the building is heated and the external air outlet is connected to deliver air from the interior of the building to the exterior of the building by way of the second channels. In some embodiments the ERV installation is reconfigurable to switch which of the first and second channels is connected to the external air intake and which of the second and first channels is connected to the external air outlet.

Another aspect of the invention comprises a panel for use in an ERV core or a humidifier core. The panel comprises a separator formed to provide projections to either side of a plane of the separator and first and second water-vapor-permeable membrane sheets attached to the projections on opposing faces of the separator. The separator holds the first and second water-vapor-permeable membrane sheets in a spaced-apart parallel relationship. The projections are formed to provide channels extending across each of the first and second water-vapor-permeable sheets between the separator and the sheets.

Example embodiments provide one or more of the following features:
  the separator is corrugated.
  the separator is perforated.
  the separator has a depth of less than 7 mm.
  the separator is formed of a material having a thickness of 0.2 mm or less.
  the separator comprises a formed aluminum sheet.
  the first and second water-vapor-permeable membrane sheets are affixed to the separator by an adhesive (which may, for example comprise a hot melt adhesive or a pressure sensitive adhesive).
  edges of the panel extending parallel to the channels are tapered in thickness. a plurality of spacer strips are attached to one of the water-vapor-permeable sheets on a side opposite to the separator, the spacer strips extending in a direction generally perpendicular to the channels. In some embodiments the spacer strips have thicknesses of at least 1.2 mm. In some embodiments the spacer strips are separated from one another by distances of at least 7 cm and/or at least 20 times a thickness of the panel and/or at least 20 times a peak-to-peak spacing of the projections of the separator.

One or more of the first vapor-permeable sheet, the second vapor-permeable sheet and the separator supports vortex-generating features as described elsewhere herein.

Another aspect of the invention provides a method for making a heat and humidity exchanger. The method comprises: forming a plurality of panels by attaching first and second membrane sheets to opposing sides of a separator formed to provide projections to either side of a plane of the separator, the first and second membrane sheets attached to the projections; and stacking the panels in a spaced-apart relationship with spacers separating the panels to provide channels between each pair of adjacent panels. The panels may have any of the combinations of features as described elsewhere herein.

Another aspect of the invention provides apparatus having any new and inventive feature, combination of features, or sub-combination of features as described herein.

Another aspect of the invention provides methods having any new and inventive steps, acts, combination of steps and/or acts or sub-combination of steps and/or acts as described herein.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIGS. 2F, 2G, 2H and 2I show example profiles for a corrugated separator.

FIG. 2J is a cross section through a portion of an example panel comprising a separator having a cross-sectional profile that includes ridges with flattened tops.

FIG. 5A, illustrates a laminated material ready to be cut into panels according to certain example embodiments.

FIG. 5B is a blown-up view of a section of a laminated material like that shown in FIG. 5A showing a first step in forming a panel edge. FIG. 5C is a blown-up view of a section of a laminated material like that shown in FIG. 5A showing a second step in forming a panel edge

DETAILED DESCRIPTION

Throughout the following description, specific details are set forth in order to provide a more thorough understanding of the invention. However, the invention may be practiced without these particulars. In other instances, well-known elements have not been shown or described in detail to avoid unnecessarily obscuring the invention. Accordingly, the specification and drawings are to be regarded in an illustrative, rather than a restrictive sense.

Figure 1:
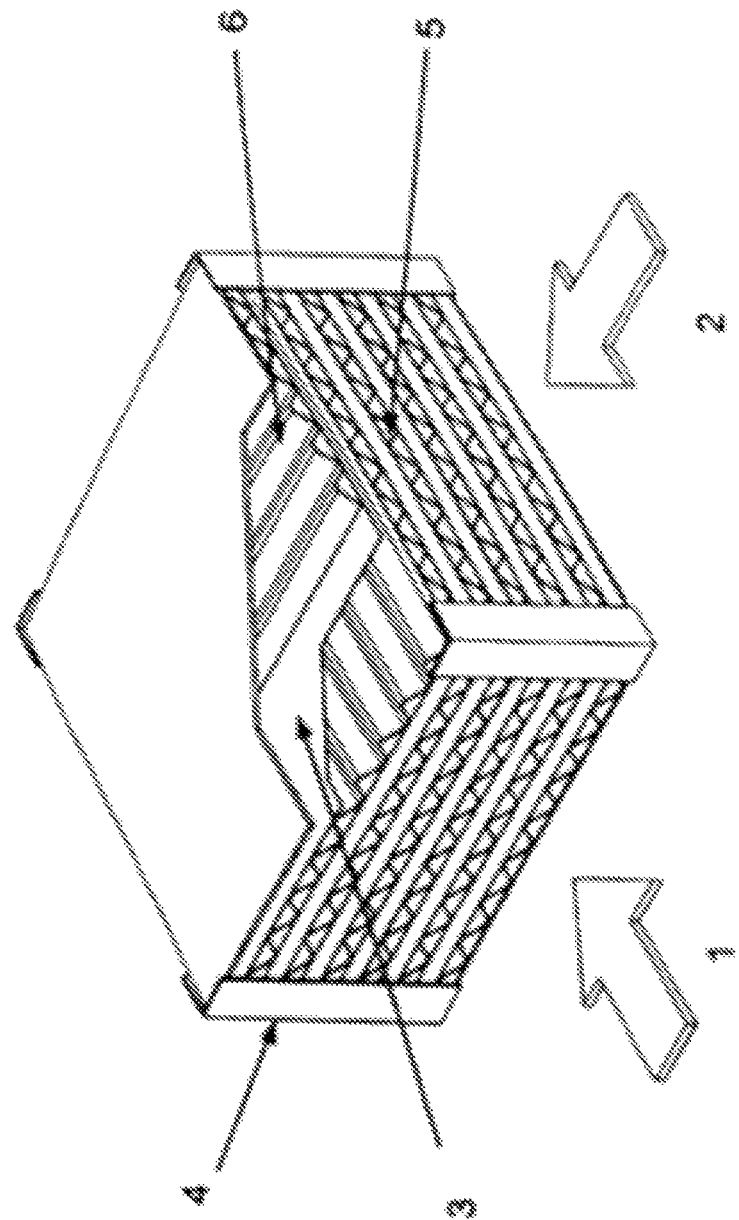
FIG. 1 is a perspective view of a conventional plate-type heat and humidity exchanger.
Figure 2:
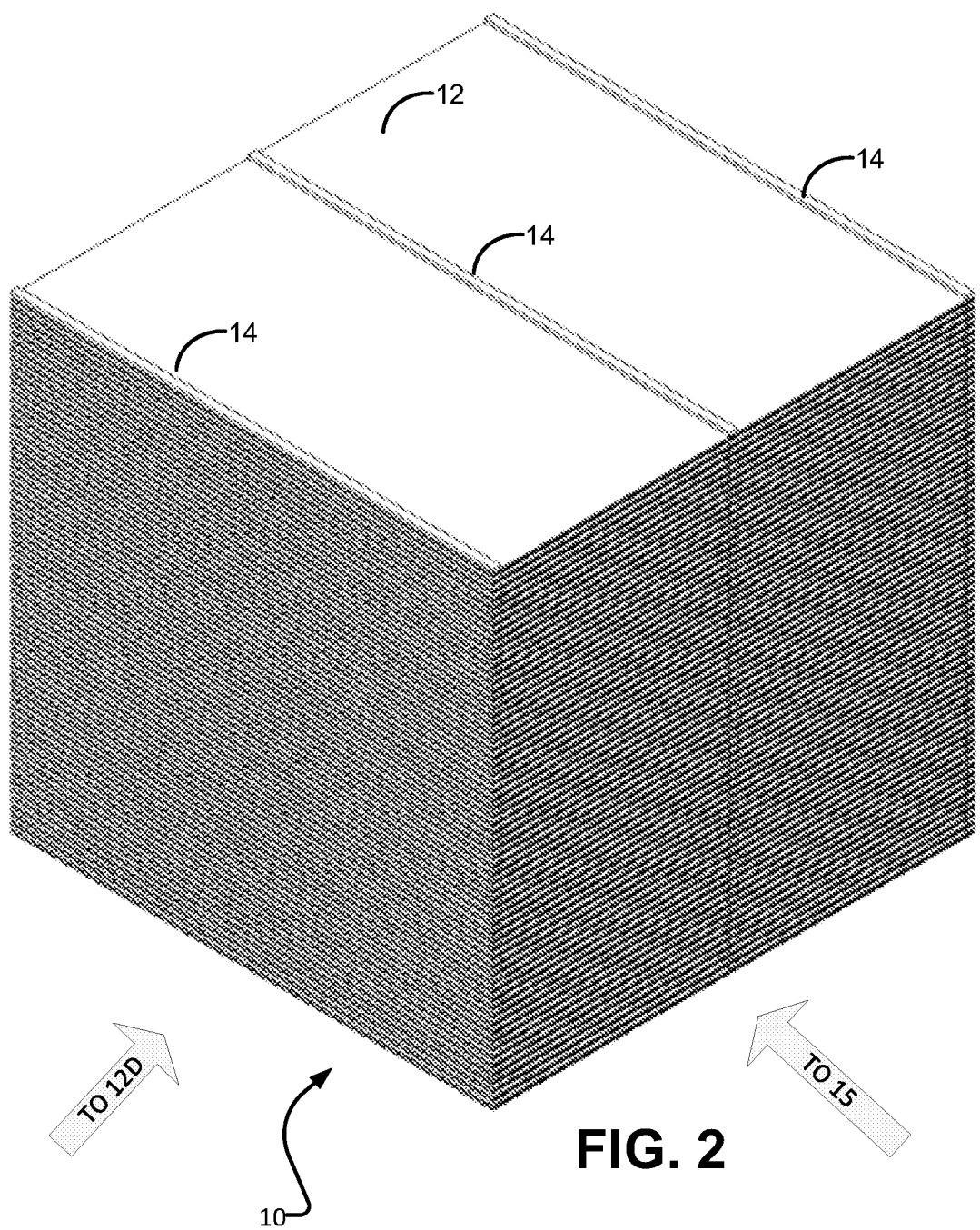
FIG. 2 is an isometric view of a heat and humidity exchanger core according to an example embodiment.

FIG. 2 is a perspective view of a heat and humidity exchanger core 10 according to an example embodiment. Core 10 comprises a plurality of panels 12 that are stacked together in a spaced apart relationship. Separation between adjacent panels 12 is maintained by spacers 14.

Each panel 12 comprises first and second membrane sheets 12A and 12B that are attached on either side of a corrugated member 12C. Each of membrane sheets 12A and 12B and corrugated member 12C may be individually flexible. However, attachment of membrane sheets 12A and 12B to corrugated member 12C results in a panel which is relatively very stiff. One measure of stiffness is the amount of deflection that results from application of a concentrated load. One way to measure stiffness of panels 12 is provided by TAPPI Standard T836.

Membrane sheets 12A and 12B are permeable to water vapor to enable exchange of humidity between a flow of air or other gas in channels 12D internal to panel 12 and air or other gas flowing outside of panel 12 adjacent to the corresponding membrane sheet 12A or 12B. Membranes 12A and 12B may be substantially air impermeable. In example embodiments, one or both of membrane sheets 12A and 12B comprises a composite polymer membrane with porous substrate and selectively water vapor permeable coating. The coating is preferably selective for water vapor (i.e. has a significantly higher permeability to water vapor than to other gases which are desired not to pass through the coating). Examples of some suitable membrane materials are described, for example, in US Patent Application Publication No. US2012/0061045, and U.S. Pat. No. 8,936,668.

Membrane sheets 12A and 12B may be thin, flexible and not self-supporting when not assembled into and supported by panels 12. Membrane sheets 12A and 12B may comprise commercially-available water vapor exchange membranes. Membrane sheets 12A and 12B may be characterized by some or all of:

High water permeation (vapor and liquid);
High water absorption;
Low or zero air and contaminant gas permeation;
Non-flammability;
Resistance to microbial growth;
Long lifetime under the required operating conditions, without detrimental leaching or loss of membrane components and without significant degradation in water vapor transport performance or increased contaminant crossover;
Tolerance to freeze-thaw cycles in the presence of liquid water condensation without significant deterioration in performance;
Low cost.

Some example membrane sheets have thicknesses in the range of 5 to 250 microns. In some embodiments the membrane sheets are more flexible in one direction than in a perpendicular direction. Such membrane sheets may be oriented so that the direction in which the sheet is stiffest is transverse to ridges of separator 12C.

In example embodiments, membrane sheets 12A and 12B are each adhesively affixed or otherwise attached to ridges of corrugated member 12C. Attachment may be continuous along each of the ridges or interrupted along some or all of the ridges. In some embodiments, attachment is continuous along one or more outermost ridges on each side of a panel 12 and is interrupted along ridges internal to panel 12. Even if adhesive is distributed only intermittently along some ridges, the adhesive may extend continuously along the outermost ridges on either edge of each sheet 12A or 12B. This construction seals along these edges. In some embodiments, the adhesive is a hot melt adhesive.

In some embodiments, sheets 12A and 12B are caused to shrink after bonding to separator 12C such that sheets 12A and 12B are taut and do not sag between their points or regions of attachment to separator 12C. Shrinkage may occur through, for example, relaxation of tensile stresses (if the membrane is pre-tensioned) or cooling post-lamination (thermal contraction).

Figure 2A:
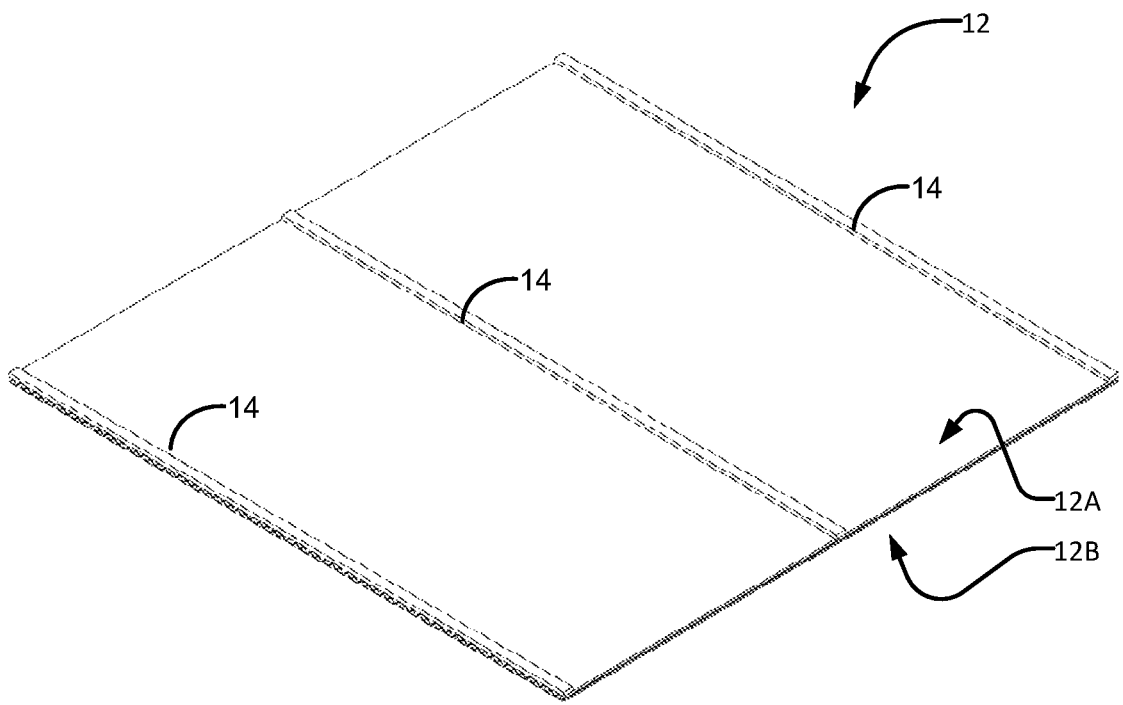
FIG. 2A is an expanded view showing a panel of the heat and humidity exchanger core of FIG. 2.

FIG. 2A shows an example panel 12 equipped with spacers 14 for separating the panel from an adjacent panel.

Figure 2C:
FIG. 2C is a cross-section view of a corrugated separator in a plane perpendicular to ridges of the corrugated separator.
Figure 2D:
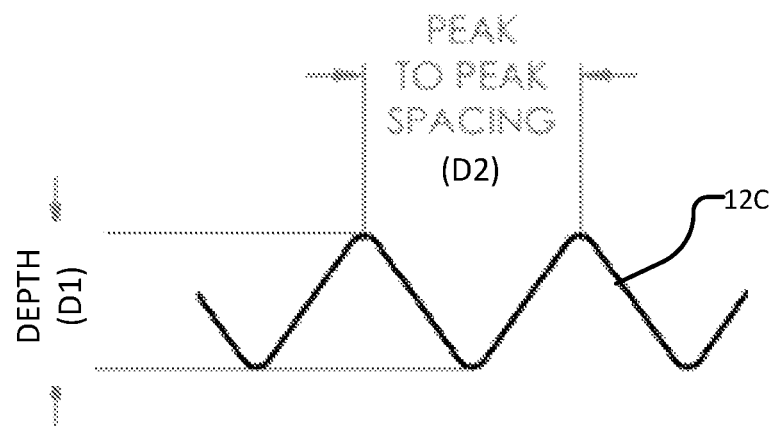
FIG. 2D is a diagram showing the depth and peak-to-peak spacing of a corrugated material.
Figure 2B:
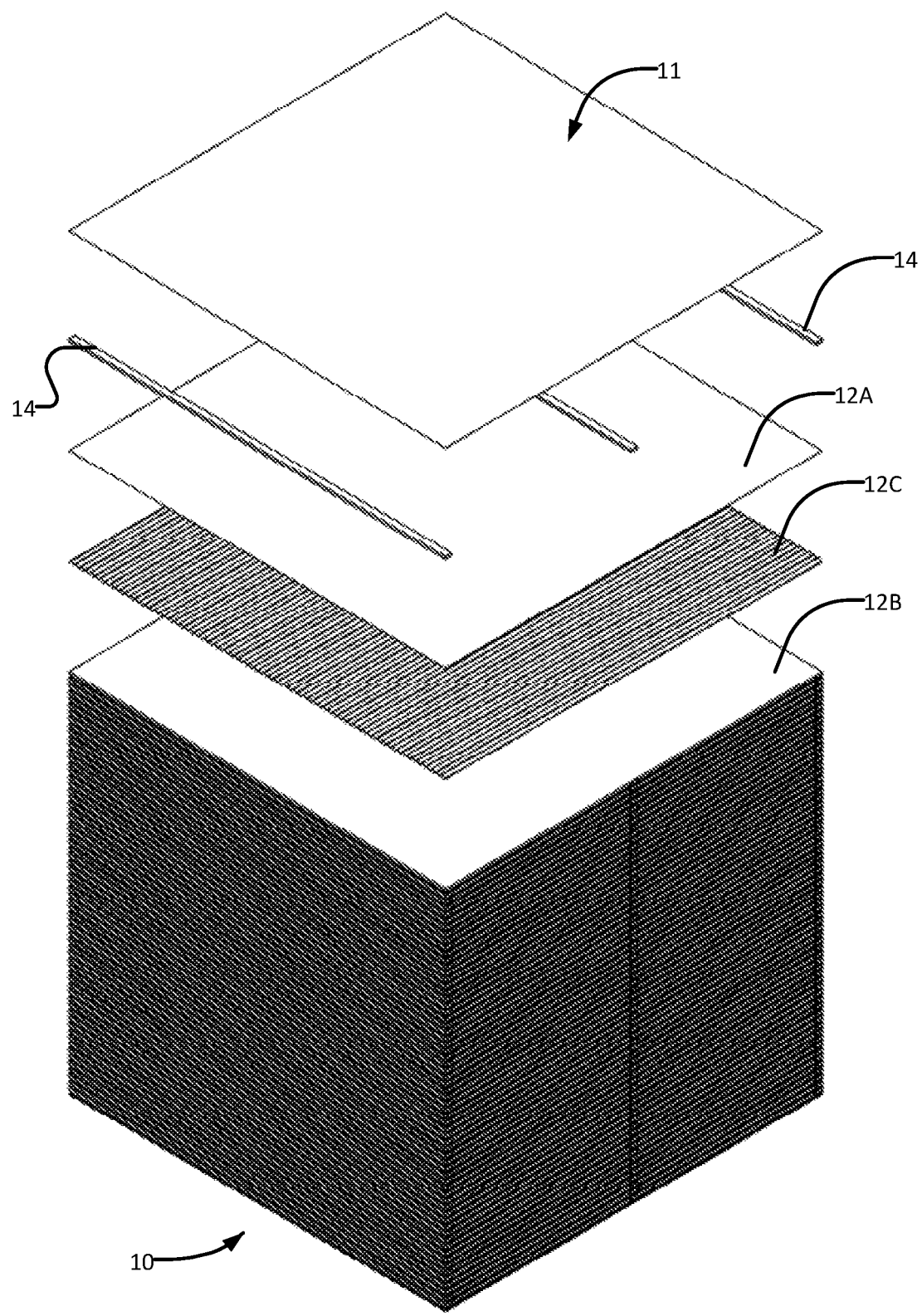
FIG. 2B is a partially exploded view of an ERV core.

FIG. 2B shows an ERV core made up of a plurality of panels 12 of the general type shown in FIG. 2A stacked together. FIGS. 2C and 2D illustrate a corrugated separator showing dimensions referred to herein as the peak-to-peak spacing and the depth.

Separator 12C is preferably made of a material or materials different from membrane sheets 12A and 12B. In some embodiments, separator 12C comprises a corrugated member formed from a sheet of a formable metal such as aluminum. Such embodiments have the advantage that corrugated members 12C are non-flammable. In other embodiments, separator 12C may comprise a plastic sheet. In some embodiments, the peak-to-peak spacing of corrugations (as defined in FIG. 2D) is in the range of about 4 mm or 5 mm to 15 mm. In an example embodiment, the peak-to-peak spacing is about 7 mm.

Separator 12C may have but does not necessarily have corrugations that are zig-zag or sinusoidal or approximately so. In some embodiments, the ridges of separator 12C are narrow in comparison to a sinusoid of the same peak-to-peak spacing. FIGS. 2F, 2G, 2H and 2I show non-limiting alternative example cross-sectional shapes for a separator 12C.

In some embodiments separator 12C has a profile that provides ridges having flattened tops. Flattened tops provide surfaces that may support strong adhesive bonds between the membranes and separator 12C. FIG. 2J is a cross-sectional view of an example separator 12C-1 that exhibits an overall cross-sectional profile that is a zig-zag profile with flat or nearly flat sections 112 that connect flattened-topped ridges 113. When assembled into a panel, with membrane sheets 114 attached at ridges 113, flat sections 112 provide triangulated support for the membrane sheets. A flattened surface of a ridge may provide a foundation for good attachment of adhesive 115 to separator 12C. Additionally, providing ridges with flattened tops may help to reduce pressure drop across channels 12D by avoiding narrow corners in the valleys 116 corresponding to ridges 113. The flattened tops may be kept fairly narrow to keep the area of membrane sheets 114 occluded by flattened-topped ridges 113 relatively small compared to the overall area of membrane sheets 114.

In some embodiments, separator 12C is perforated. Perforations may be of any suitable shape or shapes. Optionally the perforations are confined to walls of the separator which separate adjacent channels 12D.

The material from which separator 12C is formed may be thin. A separator 12C provided by a thin corrugated member may provide reduced pressure drops across channels 12D in comparison to a thicker corrugated member. In some embodiments, separator 12C is of a material having a thickness in the range of 0.001 in (about 0.025 mm) to 0.008 in (about 0.2 mm). In some embodiments separator 12C is of a material having a thickness of 0.2 mm or less.

In core 10 a plurality of panels 12 are stacked and spaced apart from one another by spacers 14. Spacers 14 may, for example, have the form of strips, rods, ribs or bars. Spacers 14 may, for example, comprise strips of plastic, aluminum, or another suitable separator material.

Spacers 14 need not be solid but may optionally be hollow. In some embodiments, spacers 14 are circular in cross-section. Spacers 14 that are circular in cross section can be advantageous because they do not require any particular orientation. Also, if circular spacers rotate during or after placement, the rotation does not change the spacing between adjacent panels 12.

Spacers 14 are dimensioned to provide channels 15 between adjacent panels 12. Heat and humidity are exchanged between gases in channels 15 and gases in the channels 12D internal to adjacent panels 12.

Ends of core 10 may be closed off by end panels 11 of any suitable material.

Spacers 14 advantageously extend continuously across panels 12. In some alternative embodiments some of spacers 14 may not extend all of the way across panels 12. For example, in some embodiments a number of shorter spacers 14 arranged end-to end are provided in place of one of the illustrated spacers 14. Ends of the shorter spacers 14 may abut one another or may be spaced apart.

In preferred embodiments, spacers 14 are oriented generally perpendicularly to the ridges of corrugated members 12C. Spacers 14 may be configured to block flow in a direction transverse to spacers 14.

Two spacers 14 may be arranged to extend along opposing edges of two adjacent panels 12. In such embodiments, the outmost spacers 14 may serve the additional function of sealing the edges of channels 15. One or more additional spacers 14 may optionally be spaced apart across panels 12. For example, a spacer 14 may be provided approximately every 50 to 200 mm. It is not mandatory that all of spacers 14 be equally spaced apart from neighboring spacers 14.

Spacers 14 defining different channels 15 may be aligned so that they are parallel with one another. In some embodiments, channels 15 are unobstructed between spacers 14 and adjacent spacers 14 are separated by distances that are one or more of:
- at least 7 cm;
- at least 20 times a thickness of panels 12;
- at least 20 times a peak-to-peak spacing of the corrugations of layer 12C of panels 12.

Figure 2E:
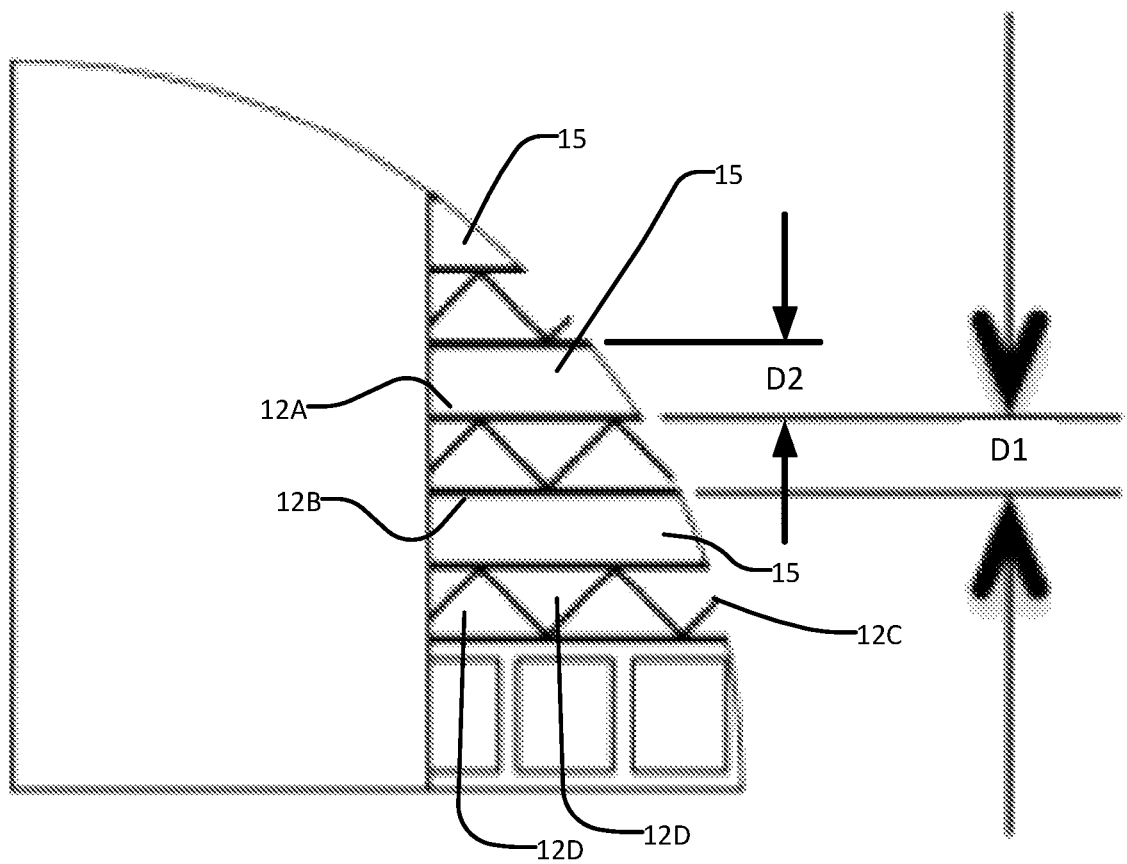
FIG. 2E is an expanded view showing a portion of the heat and humidity exchanger core of FIG. 2.

As illustrated in FIG. 2E, the spacing between adjacent panels 12 may differ from the thicknesses of individual panels 12. In particular, in some embodiments, adjacent panels 12 are spaced apart by distances D2 that are smaller than the depth D1 of corrugated members 12C which also defines the spacing between inner faces of sheets 12A and 12B in each panel 12. This result may be achieved by making spacers 14 thinner than the distance D1 between sheets 12A and 12B of one panel 12.

In some embodiments, the spacing D2 between adjacent ones of panels 12 is selected such that the pressure drop across channels 15 and the pressure drop across channels 12D for the same flow rate is at least approximately equal, at least when the flow rate is such that the flow conditions are dominated by laminar flows in channels 12D and 15.

In some embodiments, the depth D1 of separator 12C is in the range of 110% to 150% or preferably 120% to 135% of the height of channels 15 (which is shown as D2 in FIG. 2E). In an example embodiment, depth D1 of separator 12C is about 2.6 mm while the height (D2) of channels 15 is about 2 mm.

In some embodiments channels 15 and 12D are configured so that the pressure drop across channels 15 and 12D is the same to within 25 Pa at flow rates through the channels that are the same and are in the range of 35 to 95 SCFM (these flow rates might be experienced in a typical residential ERV core). In some embodiments when laminar flow is maintained through channels 15 and 12D so that the total flow through all channels 15 is the same as the total flow through all channels 12D, the pressure differential across membrane sheets 12A and 12B is everywhere less than twice the pressure drop across each set of channels (12D and 15).

In another example characteristic of some embodiments, the depth D1 of separator 12C (which is also the spacing between inner faces of sheets 12A and 12B in a panel 12) is in the range of about 1.6 mm to 7 mm. Depth D1 may be more than the spacing D2 between outer faces of sheets 12A and 12B on either side of a channel 15 (typically 110% to 150% more than D2). D2 is typically in the range of about 1.3 mm to about 5.5 mm.

In some embodiments the lateral dimensions (i.e. length and width) of panels 12 are also selected to provide a desired pressure drop across channels 12D and 15. For example, if the dimensions D1 and D2 are the same, there will tend to be a greater pressure drop across channels 12D than channels 15, for a given flow rate (because separator 12C causes some resistance to fluid flow). If it is desired to balance the pressure drop then, instead of, or in addition to, selecting a value of D2 relative to D1, the relative lengths of channels 15 and 12D may be adjusted to balance the pressure drops. For example, for the case where the pressure drop per unit length of channels 12D is greater than that for channels 15, channels 15 may be increased in length relative to channels 12D. For example, channels 15 can be made to have lengths greater than that of channels 12D by using rectangular (rather than square) panels 12. Channels 12D may extend across the shorter dimension of panels 12 and channels 15 may extend across the longer dimension of panels 12.

Another design feature that may be used to balance the pressure drop across channels 12D and 15 is the inclusion of vortex-generating features arranged to disrupt laminar flow and/or increase turbulence in one of both of channels 12D and 15. The presence of such features in a channel can increase pressure drop across the channel for a given flow rate. For example, the height (e.g. D1 or D2) of a channel may be increased and/or the length of the channel may be decreased without decreasing pressure drop across the channel if suitable vortex-generating features are added to the channel to compensate for the change in channel height or length.

In some embodiments, membranes 12A and 12B each comprise a substrate that supports a layer of a water vapor selective material. In some embodiments, the substrate is a macroporous substrate while the layer is a water vapor selective material formed as a thin dense or continuous film on one face of the macroporous substrate.

In some embodiments, the membranes are oriented such that the coated side of the membrane (i.e. the side of the membrane that carries the water vapor selective material) faces away from separators 12C. In some embodiments, the membranes are oriented such that the coated side of the membrane (i.e. the side of the membrane that carries the water vapor selective material) faces toward separators 12C. In some embodiments, the membranes are oriented such that the coated side of the membrane (i.e. the side of the membrane that carries the water vapor selective material) faces away from separators 12C. In some embodiments, the membrane adjacent one side of the corrugated member is oriented such that the coated side of the membrane (i.e. the side of the membrane that carries the water vapor selective material) faces away from separator 12C and the membranes adjacent the other side of the separator 12C is oriented such that the coated side of the membrane faces toward the separator 12C.

Particular orientations of an asymmetric membrane (such as a membrane with a coating on one side) may offer advantages in certain applications of the heat and humidity exchangers described herein. Some factors which may guide the choice of which way to orient asymmetric membranes in panels 12 on either side of corresponding separators 12C include:

Whether the adhesive or bonding mechanism used to attach the membranes to one or the other of the corrugated separator 12C or spacers 14 adheres better to the coated or uncoated side of the membrane.

For some coatings, optimum performance can be achieved by orienting the membrane such that the coating faces toward the more humid stream.

Some membrane coatings may have a permeability to moisture that is temperature-dependent. For example, the vapor-permeability of a membrane coating may increase with temperature. This property may be exploited by orienting the membrane so that the coated side of the membrane faces the warmer stream (which is typically also the more-humid stream).

Industry standards for the effectiveness of ERV installations require greater latent effectiveness for cooling applications than for warming applications. In ERV installations located in regions having climates where the ERV will be used in both warming (usually winter) and cooling (usually summer) conditions the membranes may be oriented such that the coated side of the membrane faces the stream that is more-humid during warming conditions so as to provide increased latent effectiveness in the cooling conditions.

In cases where cold air is directed through channels 12D so that condensation may occur in open channel 15, the membrane(s) bounding open channel 15 may be oriented with the coated side facing open channel 15 to facilitate draining of liquid water from channels 15 and to facilitate defrosting or ice melting.

One advantage of some embodiments is that the relatively unobstructed channels 15 present reduced resistance to gas flow. Furthermore, under potential icing conditions unobstructed channels are much less likely to become obstructed by the buildup of frost or ice than small individual channels as are present in some prior art heat and humidity exchanger designs. This is partly because there are fewer walls against which frost can build up. In some constructions frost may form on impermeable walls of a separator. With small channels, once one of the channels becomes partially obstructed by ice, the fluid will tend to by-pass that channel which then will increase the tendency for the channel to become completely blocked. The materials used (such as for the separators, membrane coating or spacers) may be selected to be hydrophobic or change the surface tension to allow condensation to better drain and improve frost inhibition.

In some embodiments, lateral edges of panels 12 are tapered in thickness so as to provide tapered lead-ins and/or lead-outs to channels 15. This construction can further reduce pressure drops across channels 15.

In some embodiments tapered lead ins are also provided for channels 12D. For example, outermost spacers 14 may have tapered portions that project outwardly past openings of channels 12D and thereby provide tapered lead-ins and/or lead-outs to channels 12D. This construction can further reduce pressure drops across channels 12D.

In some embodiments vortex-generating features are provided to increase turbulence in the flow within channels 12D and/or 15. Where a flow of gas (e.g. moist air) in the channels has some flow separation a degree of turbulence can cause mixing that allows different portions of the gas to be brought into contact with the membrane as the gas flows through the channel. Vortex generating features may comprise small projections and/or recesses formed in one or more of the surfaces that bound the channels. For example, in some embodiments vortex-generating features may be provided by embossing one or both layers of membrane in a panel to provide concavities and/or convexities facing channels 12D and/or 15.

Vortex-generating features may be arranged to modify the flow field inside the channels at a desired flow rate, to increase heat and moisture transfer without causing an excessive increase in pressure drop (energy loss in the flow due to fluid friction and drag) across the channels. In some embodiments vortex-generating features are formed into a separator 12C and/or spacers 14 in addition to, or instead of, forming the vortex-generating features in the membranes. For example, the material of a separator 12C may be formed to provide projections, apertures, flaps or recesses in walls of channels 12D and/or projections and/or indentations may be provided along edges of spacers 14.

In addition to providing improved contact between the membrane and the air flowing in the channels bounded by the membrane, vortex generating features may be used in combination with other design features to balance pressure drop across channels 12D with pressure drop across channels 15.

Vortex-generating features may have any of a wide variety of configurations. For example, such features may comprise small tetrahedral, rectangular, square, irregular or peg-like projections from a surface bounding one of the channels. Such features may be presented as a regular array or an irregular array. In some embodiments, such features are provided more densely at an inlet end of a channel and are reduced or absent in a portion toward an outlet end of the channel.

In some embodiments, the vortex-generating features have dimensions on the order of 1 mm. For example, such features project from a surface by a distance in the range of ⅛ mm to 2.5 mm in some embodiments. Such features have a width in a direction transverse to the channel in the range of ⅛ mm to 5 mm in some embodiments. In some embodiments some or all of the features are elongated in a direction that is generally parallel to the longitudinal axis of the channel.

Figure 2K:
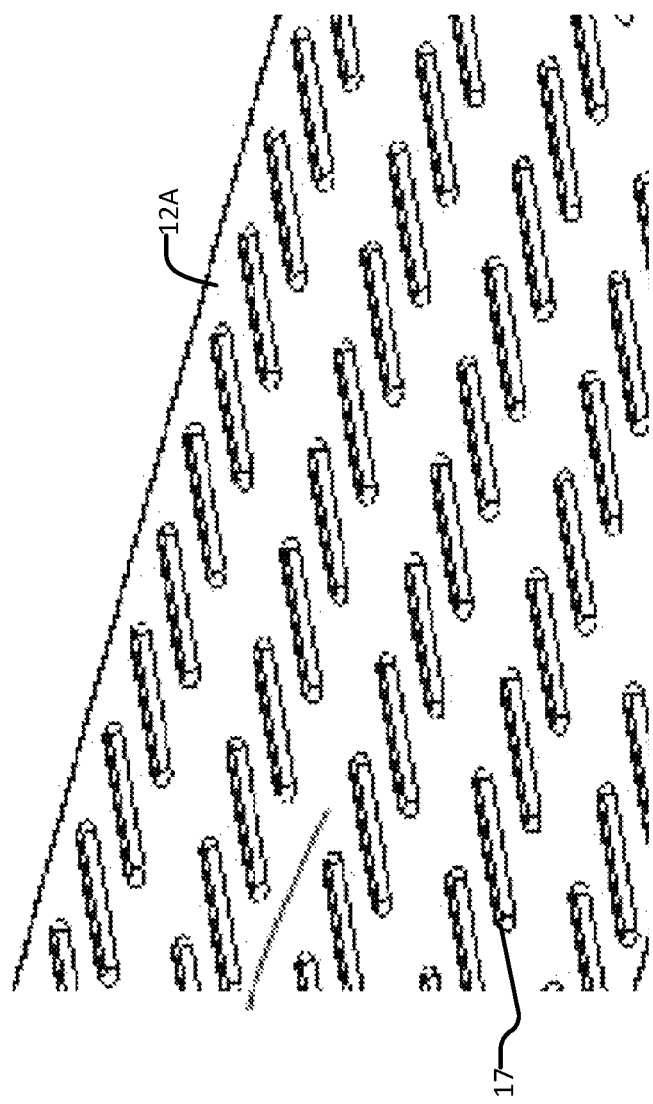
FIG. 2K is a perspective view of a portion of a membrane provided with vortex-generating features.

FIG. 2K shows a portion of a membrane 12A that is embossed with vortex-generating features in the form of an array of rectangular projections 17. In an example embodiment, the projections have a length of about 7.5 mm, a width of about 0.6 mm and a height of about 0.65 mm. The opposing face of membrane 12A may be patterned with indentations corresponding to each of features 17.

Figure 3:
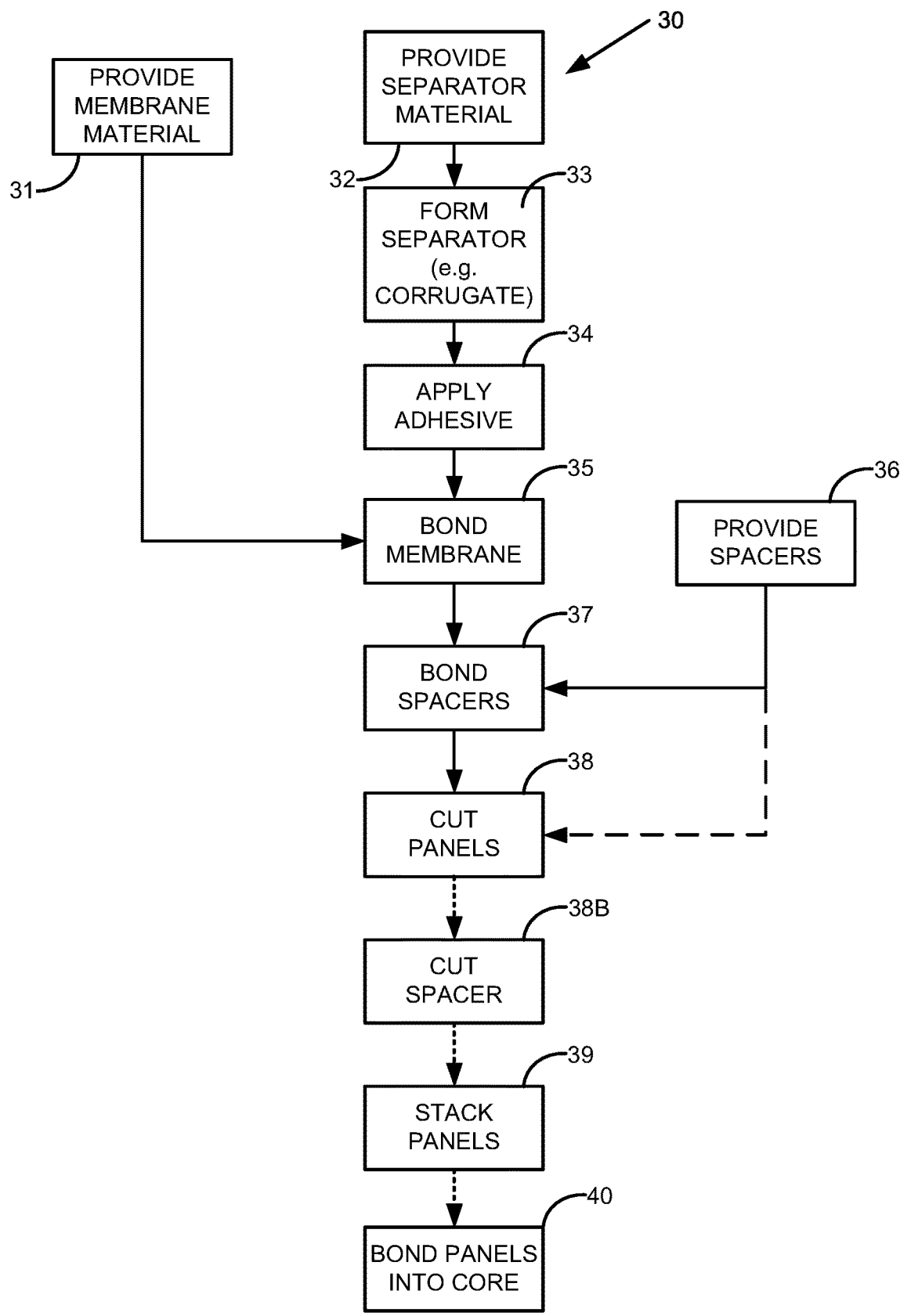
FIG. 3 is a flow chart illustrating a method for making a heat and humidity exchanger core according to one embodiment.

FIG. 3 is a flow chart illustrating a method 30 providing a sequence of steps that may be applied to make a heat and humidity exchanger core according to an embodiment of the invention. In some embodiments of the method the steps may be performed in a different sequence, and/or some of the steps may be omitted and/or there may be additional steps involved.

In block 31, sheets of membrane are supplied. The sheets of membrane may, for example, be supplied in the form of rolls having widths equal to one dimension of panel 12. In block 32, a separator sheet material is provided. The separator sheet material may also, for example, be provided in a roll of material. The width of the separator sheet material provided in block 32 may be substantially equal to the width of the membrane sheets provided in block 31.

In block 33, the separator sheet material is corrugated, for example by forming between patterned (e.g. toothed) rolls or pressing.

In block 34, adhesive is applied along ridges of the corrugated separator sheet. The adhesive may, for example, comprise a hot melt adhesive or pressure sensitive adhesive. In some embodiments the adhesive is applied by adhesive-coated rollers that contact the ridges of the corrugated separator sheet and/or by nozzles that eject drops, beads or ribbons of adhesive onto the ridges of the corrugated separator sheet.

In block 35, the membrane sheets are adhered on either side of the corrugated separator sheet to form a laminated material. In some embodiments, the membrane sheets are applied simultaneously to the opposed faces of the corrugated separator sheet. Such embodiments, in which the membrane sheets are affixed substantially simultaneously at diametrically-opposed locations on opposing faces of the corrugated spacer sheet, may be advantageous for enhancing overall flatness of the panels and/or reducing any tendency of the membrane to sag. In some embodiments, one of the membrane sheets is applied to one face of the corrugated separator sheet before the other membrane sheet is applied to an opposing area on the other face of the corrugated separator sheet.

Block 36 provides spacers (e.g. spacers 14). The spacers may be supplied already cut to a desired length or may be also drawn from a roll, or may be cut to length from longer pieces or may be extruded directly onto the membrane. In block 37, the spacers are bonded at desired locations to one of the membrane sheets. In block 38, panels are cut from the laminated material. Blocks 37 and 38 could be performed in either order (i.e. spacers 14 could be applied before or after individual panels 12 are formed).

Spacers may, for example, be applied to panels 12 by extruding the spacers on to the panels 12, gluing the spacers into place, attaching the spacers adhesively or the like. In some embodiments, spacers 14 may be applied as a settable material such as a liquid, paste or gel. In such embodiments, a temporary spacing member may be applied to separate adjacent panels 12 by a desired spacing. The temporary spacing member may be removed after the settable material has hardened sufficiently to maintain the desired spacing.

In some embodiments, block 38 comprises removing the membrane from one side of the laminated material between two ridges of the corrugated separator. Removal of the membrane may, for example, comprise laser cutting, cutting with a heated ribbon, cutting with a movable blade etc. Cutting the panels may further comprise a step of cutting through the corrugated member and the opposing membrane at a point where the corrugated member is affixed to the opposing membrane as indicated in block 38B.

In block 39, the resulting panels are stacked. In block 40 the spacers previously attached to a membrane on one side of the panels are bonded to an adjacent panel in the stack.

When the desired number of panels have been assembled into the stack, the core is completed and may be ejected from the apparatus. The method optionally includes additional steps such as the application of seals or a frame etc.

Figure 4:
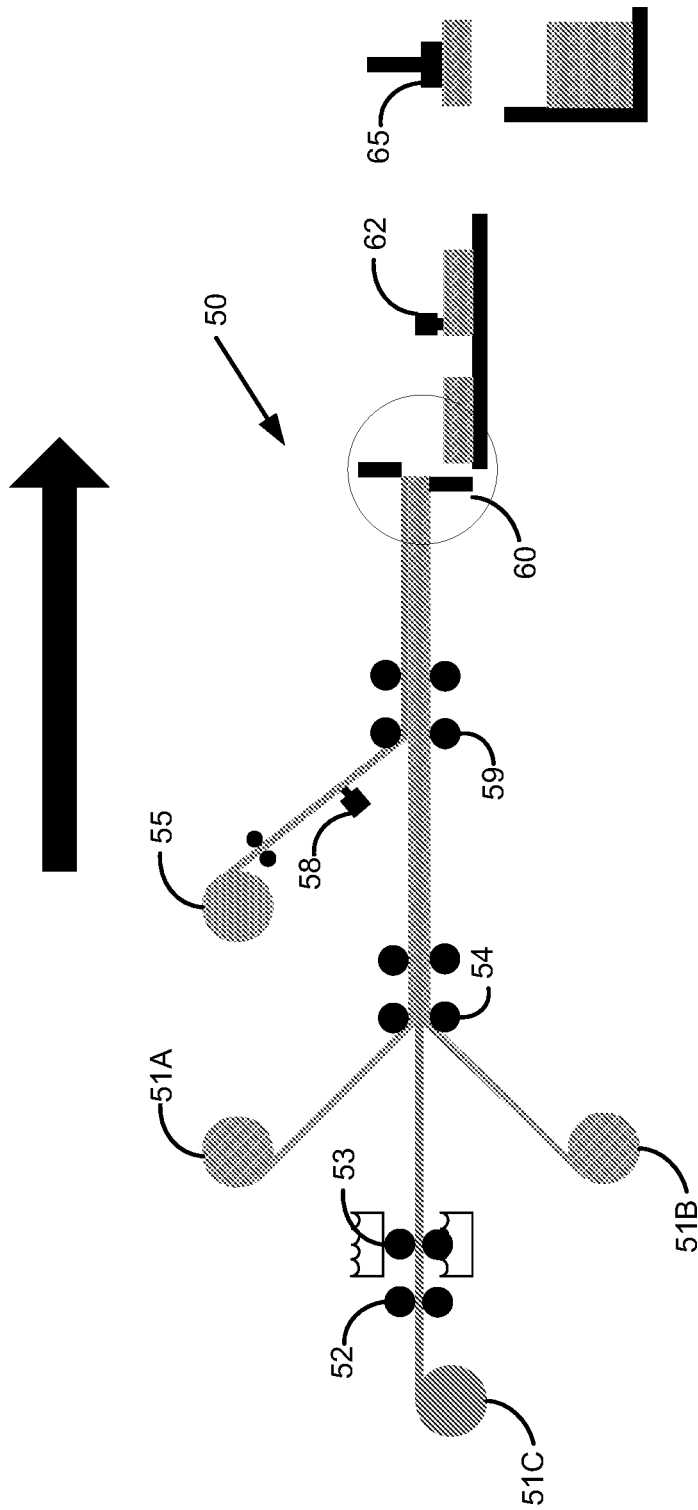
FIG. 4 illustrates an example production line for the manufacture of heat and humidity exchanger cores according to an example embodiment.

FIG. 4 shows apparatus 50 according to an example embodiment for manufacturing ERV cores 10. Apparatus 50 employs rolls of membrane material 51A and 51B and a roll of separator material 51C. Separator material, for example, aluminum foil, passes between corrugating rollers 52. Adhesive applicator 53 applies adhesive to ridges of the corrugated separator material. Adhesive applicator 53 may, for example, comprise an adhesive-coated roller.

In some embodiments of the apparatus the corrugation depth (e.g. D1 in FIG. 2E) is readily and conveniently adjustable. In the illustrated embodiment the separator material is corrugated perpendicular to the direction of movement of the materials through rollers 52. Other embodiments may form corrugations extending in another direction (e.g. parallel to the direction of movement).

Sheets of membrane from rolls 51A and 51B are brought together on either side of the corrugated separator material at rollers 54 which bond the membrane to the separator material to form a laminated material.

The corrugated separator material is optionally compressed slightly in a direction perpendicular to the corrugations prior to bonding, so that the membrane will be stretched or held in tension after it is bonded to the separator material. After rollers 54, the membranes and the separator sheet form a laminated material with membrane sheets bonded to either side of the corrugated separator sheet. Spacer strips are fed from a roll 55 of strip material. Adhesive is applied to each spacer strip by an adhesive applicator 58. Spacer strips are bonded to one side of the laminated material at rollers 59. In other embodiments, the spacer strips can be extruded directly on to the membrane. For example spacer strips may be made from a melt-processable plastic and may be extruded onto the laminated material.

A cutting device 60 such as, for example, a shear or laser cutter cuts the laminated material into panels 12. An adhesive applicator 62 applies adhesive to the spacers 14 on each panel 12. At stacker 65, the panels 12 are stacked on top of one another and bonded together.

In some embodiments, edges of panels 12 are cut to provide a tapered lead-in to channels 15. One way to achieve this is illustrated in FIGS. 5A to 5C. In such embodiments, membrane 12A may be cut close to a point at which it is adhered to an outermost ridge on one side of panel 12 and membrane 12B may similarly be cut at a location close to the point where membrane 12B is affixed to an outermost ridge on the other side of panel 12. This exposes an angled face 12E of corrugated member 12C. Such tapered edges may optionally but preferably be formed along both opposed edges of a panel 12. Each of these opposed tapered edges smooth the flow of air or other gas into and out of channels 15.

In some embodiments, panels 12 are stacked and held together by a frame comprising corner members 18 (see FIG. 2). Corner members 18 comprise L-shaped members in some embodiments.

The construction described herein may be altered to make ERV cores of many configurations. For example, panels 12 may be square but may also have other shapes (e.g. rectangular or even rounded shapes).

In some embodiments, membrane sheets 12A and 12B and corrugated member 12C are made of a material compatible with non-adhesive bonding processes. For example, a substrate of membrane sheets 12A and 12B may comprise a plastic material that can be bonded to a plastic material of corrugated member 12C by a welding process (e.g. laser welding or ultrasonic welding or thermal welding). Similarly, in some embodiments, spacers 14 are made of a material compatible with non-adhesive bonding processes.

In some embodiments, corrugated member 12C is replaced with a member that is stamped or otherwise formed to provide projections such as dimples, ridges or bumps externally to either side which support sheets 12A and 12B in a spaced-apart parallel relationship and which, when attached to sheets 12A and 12B yield a relatively stiff self-supporting panel 12.

Cores as described herein may be integrated into a heat and humidity exchanger system which includes first plenums connected to bring flows of air to and from channels 15, second plenums connected to bring flows of air to and from channels 12D and blowers connected to maintain equal total flow volumes through channels 15 and 12D. The heat and humidity exchanger system may be constructed to provide even flow distribution across each of channels 15. The heat and humidity exchanger system may be constructed to provide even distribution of flow among channels 12D.

In some embodiments a heat and humidity exchanger is arranged so that warmer, more humid air being exhausted from a building in winter is carried in channels 15 which are more open and therefore more likely to avoid frost formation than channels 12D. This arrangement may permit operation at lower outside temperatures.

In some embodiments, coatings on membrane sheets 12A and 12B are arranged to face outside air being drawn into a building. This arrangement can improve latent heat transfer in the summer (when incoming outside air is relatively hot and humid as compared to cooler air conditioned air being exhausted from the building).

In some applications it is desirable to run a heat and humidity exchanger so as to carry more flow (higher mass transport) in one direction than in another. For example, in a commercial application it may be desirable to provide more flow on a supply side (fresh air entering a structure) than on an exhaust side (air exiting the structure by way of the heat and humidity exchanger). This may be done to maintain a positive pressure inside the structure and/or to make up for air escaping through doors, windows or other leakage pathways or when some return air is not distributed back to the ERV system. In such cases it may be beneficial to use channels 15 as the supply side. If channels 15 are operating at a pressure slightly higher than channels 12D, the resulting forces on panels 12 will tend to compress panels 12.

It would be desirable to provide ERV cores and other heat and/or vapor exchangers that include channels that carry flow of air or other gas to be dehumidified or humidified are wide and open. For example, two parallel flat membranes defining an entirely open channel between them would be beneficial. Due to limitations in the rigidity of the thin water-vapor permeable membranes, this is not generally possible. In heat and mass transfer theory validated empirically, a channel geometry more closely approaching a circle will provide higher heat and mass transfer for laminar flow given by the Nusselt number. Therefore, an open channel increases mass transfer coefficients relative to a triangular channel, since diffusion and convective transfer in the third dimension is affected by the shape of the channel. Likewise, the Nusselt number for two parallel flat plates corresponds to increased mass transfer coefficients relative to a square channel Non-limiting example constructions for heat and vapor exchangers based on the foregoing teachings include:

An ERV installation for use in warm and humid climates, such as in the southern United States may be constructed such that more-humid, warmer air flows into an air-conditioned building through one set of channels 12D or 15 and cooler, less-humid air flows out of the building through the other one of channels 15 and 12D. In such installations it can be advantageous to orient a membrane such that the coated side of the membrane is preferably oriented such that the coating faces the more-humid incoming air. This generally allows for the higher transfer of water vapor that is to be removed from the incoming stream (dehumidification). Vortex generators may optionally be provided to cause turbulence in the incoming more-humid and hotter stream, to enhance contact between water vapor being carried in the incoming air and the surface of the membrane. In this application, an example typical spacing between adjacent plates 12 is in the range of 1.5 mm to 5 mm, to allow for high flow rates and low pressure drop, or increased heat and mass transfer.

An ERV installation in a residential unit located where the climate is cold, such as in Canada or the northeast United States may be constructed so that colder, less-humid air flows into a heated building through one set of channels 12D or 15 and warmer, more-humid air flows out of the building through the other set of channels 15 and 12D. Such an installation may be arranged to reduce the tendency for formation of frost in the channels carrying more-humid air and to facilitate drainage of condensate that may form in the channels. In such applications it is generally advantageous to allow outgoing warmer, more-humid air to flow through open channels 15. This can allow warm air to more-easily reach frost locations in the core, and can also facilitate drainage of condensate from channels 15. In some embodiments channels 15 are oriented such that the membranes bounding channels 15 are non-horizontal (e.g. vertical or tilted to facilitate gravity-assisted drainage of condensate). Vortex generators, if provided, are preferably provided on the dry supply side (i.e. in channels 12D). This reduces the possibility that vortex generators could make frost formation more likely, or serve as sites for nucleation of liquid water. For higher water vapor transfer, the membranes may be oriented such that a coated side of the membrane faces the more-humid outgoing stream.

In some regions an ERV may function for one part of the year to bring warm moist air into a building and to allow cool drier air to exit the building, and for another part of the year to bring cold dry air into the building and to expel heated more-humid air from the building. Some ERV installations are reconfigurable to selectively allow intake air to pass through channels 12D or 15 and to allow air being expelled from the building to pass through the other set of channels 15, 12D. This allows the ERV installation to be configured, as described above, to suit either part of the year.

A water vapor exchanger or humidifier, for an example automotive fuel cell application, may have pitches in the range of 0.3 mm to 1.5 mm, for example. In such applications it is often desirable that sizes of plates 12 are typically 200 mm or less in width or length. Separator strips in channels 15 may, for example, be spaced apart by distances in the range of about 30 mm to about 100 mm.

In addition to a heat and humidity exchanger as described herein An ERV installation may include ductwork for bringing outside air into a building by way of the heat and humidity exchanger and carrying inside air out of the building by way of the heat and humidity exchanger, one or more blowers for driving air flow in one or both directions and a control system. In some embodiment the control system includes sensors for some or all of air temperature at one or more locations, air moisture content at one or more locations, liquid water at one or more locations air pressure drop across one or both sides of the heat and humidity exchanger air flow through the heat and humidity exchanger and the like. In response to inputs from the sensors the controller may take action such as regulating air flow into and/or out of the building, defrosting the heat and humidity exchanger or the like.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Methods as described herein may be varied in a range of ways. For example, while processes or blocks are presented in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. In addition, while processes or blocks are at times shown as being performed sequentially, they may instead be performed simultaneously or in different sequences. It is therefore intended that the following claims are interpreted to include all such variations as are within their intended scope.

Where a component (e.g. frame, fan, membrane, panel, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Where this disclosure indicates that a feature is provided "in some embodiments" or in "example embodiments" that feature may optionally be provided an any other described embodiment as long as the feature is not incompatible with the other described embodiment. The feature may be provided on its own or in any combination with other features.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A heat and moisture exchanger comprising a plurality of panels, each of the panels comprising:
    a flow field insert having a first face and an opposing second face; and
        a water-vapor permeable membrane material in contact with the first face and the opposing second face of the flow field insert, the flow field insert and the water-vapor permeable membrane material cooperating to define first channels for carrying a first fluid flow in a first direction through each of the panels, the first fluid flow parallel to the first face and the opposing second face of the flow field insert;
        wherein the panels are stacked in a parallel spaced-apart relationship with elongate spacers interposed between adjacent panels, the elongate spacers spaced apart from one another such that the panels and elongate spacers define second channels for carrying a second fluid flow in between adjacent panels in a second direction transverse to the first direction.

2. A heat and moisture exchanger according to claim 1 wherein adjacent panels are spaced apart from one another by a distance that differs from the panel thickness.

3. A heat and moisture exchanger according to claim 1 wherein adjacent panels are spaced apart from one another by a distance that is less than the panel thickness.

4. A heat and moisture exchanger according to claim 1 wherein the flow field insert has a thickness that is in the range of 110% to 150% of the thickness of the elongate spacers.

5. A heat and moisture exchanger according to claim 1 wherein the thickness of the water-vapor-permeable membrane material is in the range of 5 to 250 microns.

6. A heat and moisture exchanger according to claim 1 wherein two of the elongate spacers interposed between adjacent the panels extend along opposing edges of the panels.

7. A heat and moisture exchanger according to claim 1 wherein the flow field inserts are formed from metal and/or plastic.

8. A heat and moisture exchanger according to claim 1 wherein the elongate spacers are formed from metal and/or plastic.

9. A heat and moisture exchanger according to claim 1 wherein the water-vapor-permeable membrane material comprises a substrate having an air-impermeable, water-vapor permeable coating on one surface of the substrate, wherein the water-vapor-permeable membrane material of each panel is oriented such that the coating faces into the second channels.

10. A fuel cell humidifier comprising a plurality of panels, each of the panels comprising:
    a flow field insert having a first face and an opposing second face; and
    a water-vapor permeable membrane material in contact with the first face and the opposing second face of the flow field insert, the flow field insert and the water-vapor permeable membrane material cooperating to define first channels for carrying a first fluid flow in a first direction through each of the panels, the first fluid flow parallel to the first face and the opposing second face of the flow field insert;
    wherein the panels are stacked in a parallel spaced-apart relationship with elongate spacers interposed between adjacent panels, the elongate spacers spaced apart from one another such that the panels and elongate spacers define second channels for carrying a second fluid flow in between adjacent panels in a second direction transverse to the first direction;
the fuel cell humidifier further comprising:
    a first inlet port and a first outlet port, the first inlet port fluidly connected to the first outlet port by the first channels, said first inlet port for connecting to a cathode outlet port of a fuel cell assembly;
    a second inlet port and a second outlet port, the second inlet port fluidly connected to the second outlet port by said second channels, said second inlet port for connecting to a cathode inlet port of a fuel cell assembly
    wherein the panels have a panel thickness, the second channels each have a width of at least 20 times the panel thickness, and the elongate spacers interposed between adjacent panels are spaced apart from one another by a distance in a range of 30 to 100 mm.

11. A fuel cell humidifier according to claim 10 wherein the length and width of the flow field insert are no greater than 200 mm.

12. A fuel cell humidifier according to claim 10 wherein adjacent panels are spaced apart from one another by a distance that is less than the panel thickness.

13. A fuel cell humidifier according to claim 10 wherein the water-vapor-permeable membrane material comprises a substrate having an air-impermeable, water-vapor permeable coating on one surface of the substrate, wherein the water-vapor-permeable membrane material of each panel is oriented such that the coating faces into the second channels.

\* \* \* \* \*